(12) United States Patent
Bu et al.

(10) Patent No.: US 12,206,518 B2
(45) Date of Patent: Jan. 21, 2025

(54) FRAME PROCESSING AT AN ACCESS POINT

(71) Applicant: Hewlett Packard Enterprise Development LP, Houston, TX (US)

(72) Inventors: Yunfei Bu, Beijing (CN); Guangzhi Ran, Beijing (CN); Xuguang Jia, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 534 days.

(21) Appl. No.: 17/487,586

(22) Filed: Sep. 28, 2021

(65) Prior Publication Data

US 2023/0101910 A1 Mar. 30, 2023

(51) Int. Cl.
| | |
|---|---|
| *H04L 12/18* | (2006.01) |
| *H04W 12/37* | (2021.01) |
| *H04W 80/00* | (2009.01) |
| *H04W 84/12* | (2009.01) |
| *H04W 88/08* | (2009.01) |

(52) U.S. Cl.
CPC ........... *H04L 12/189* (2013.01); *H04W 12/37* (2021.01); *H04W 88/08* (2013.01); *H04W 80/00* (2013.01); *H04W 84/12* (2013.01)

(58) Field of Classification Search
CPC .............. H04L 12/189; H04W 12/088; H04W 12/37; H04W 80/00; H04W 80/02; H04W 84/12; H04W 88/08; H04W 88/10
See application file for complete search history.

(56) References Cited

U.S. PATENT DOCUMENTS 6,757,298 B1 * 6/2004 Burns ................ H04L 12/5601
370/473
7,787,401 B2 8/2010 Kinder et al.
(Continued)

FOREIGN PATENT DOCUMENTS

| CN | 108184237 A | * | 6/2018 | ............ H04W 12/02 |
| GB | 2560562 A | | 9/2018 | |

(Continued)

OTHER PUBLICATIONS

Fu, "A Household Wireless Local Area Network Connecting Device And Automatic Connection Method Thereof," English Machine Translation of Fu (CN 108184237 A), Clarivate Analytics, pp. 1-6 (Year: 2024).*

*Primary Examiner* — Kibrom T Hailu
*Assistant Examiner* — Kai Chang
(74) *Attorney, Agent, or Firm* — Hewlett Packard Enterprise Patent Department

(57) ABSTRACT

In embodiments of the present disclosure, a method is provided for performing a frame processing operation on a broadcast/multicast frame at a physical access point (AP). A pre-processing operation is performed on the frame at a protocol layer between a physical layer and an upper layer of the AP to obtain a pre-processed frame. The pre-processing operation comprises a common operation to be performed for the plurality of virtual interfaces at the protocol layer. In this way, by performing a pre-processing operation common to the virtual interfaces supported by the physical AP, the consumption of resources caused by the performance of repeated operations in the frame processing operation can be reduced.

20 Claims, 5 Drawing Sheets

(56) References Cited

U.S. PATENT DOCUMENTS

| | | | |
|---|---|---|---|
| 7,869,432 B1 * | 1/2011 | Mollyn | H04L 12/4641 |
| | | | 370/257 |
| 7,970,894 B1 | 6/2011 | Patwardhan | |
| 8,000,698 B2 | 8/2011 | Wolman et al. | |
| 10,051,581 B2 | 8/2018 | Wang et al. | |
| 2008/0126559 A1 * | 5/2008 | Elzur | H04L 69/08 |
| | | | 709/232 |
| 2012/0230202 A1 * | 9/2012 | Reed | H04L 63/0209 |
| | | | 370/241 |
| 2013/0044735 A1 * | 2/2013 | Lee | H04W 84/12 |
| | | | 370/336 |
| 2013/0064107 A1 * | 3/2013 | Sridhar | H04W 24/02 |
| | | | 370/252 |
| 2013/0250970 A1 * | 9/2013 | Yu | H04L 12/2859 |
| | | | 370/463 |
| 2015/0282005 A1 * | 10/2015 | Du | H04W 28/065 |
| | | | 370/394 |
| 2017/0279676 A1 * | 9/2017 | Lu | H04L 49/354 |
| 2018/0184401 A1 * | 6/2018 | Ghosh | H04W 72/04 |
| 2018/0199271 A1 | 7/2018 | Viger et al. | |
| 2020/0120711 A1 | 4/2020 | Sevin et al. | |
| 2020/0287996 A1 * | 9/2020 | Vann | H04L 47/32 |
| 2021/0337613 A1 * | 10/2021 | Seok | H04W 76/11 |

FOREIGN PATENT DOCUMENTS

| | | |
|---|---|---|
| WO | 2017/153498 A1 | 9/2017 |
| WO | 2019/166295 A1 | 9/2019 |
| WO | 2020/176848 A1 | 9/2020 |

* cited by examiner

FRAME PROCESSING AT AN ACCESS POINT

BACKGROUND

Recent developments provide that a single physical access point (AP) can support a plurality of virtual interfaces. The plurality of virtual interfaces are logical entities supported by the physical AP. Each of the plurality of virtual interface may operate as an AP. For example, the physical AP can support a plurality of basic service sets (BSSs) for a plurality of virtual access points (VAPs). This avoids the need of one physical AP per BSS and at the same time supports more services and functionalities.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
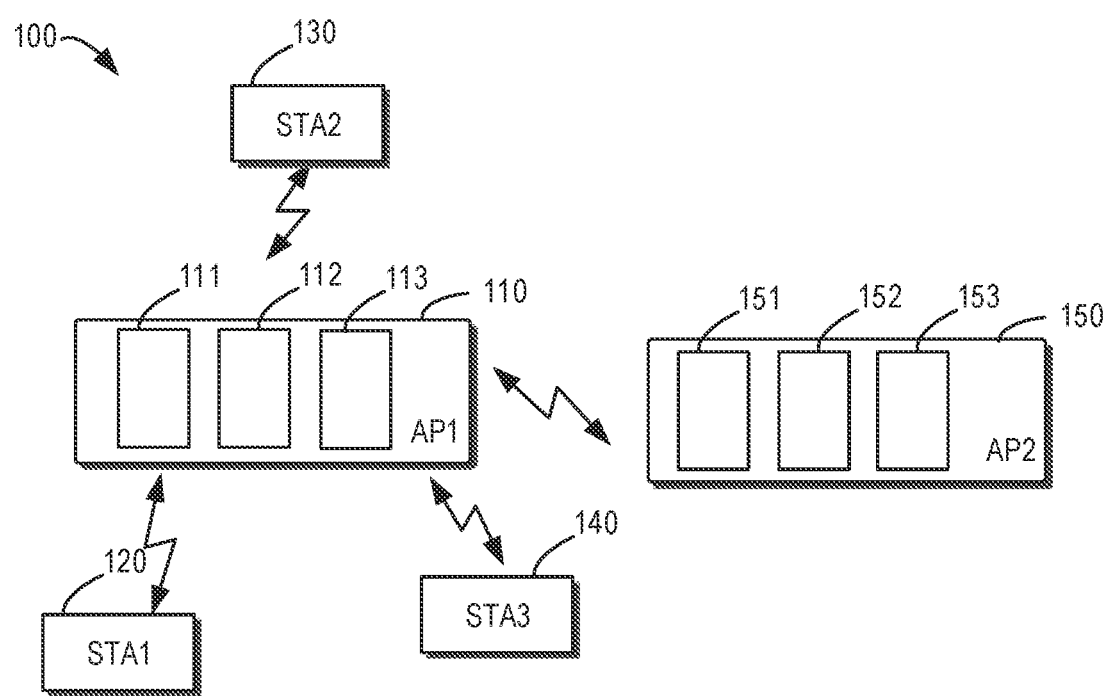
FIG. 1 illustrates an example environment in which example embodiments of the present disclosure can be implemented.

As described above, a physical AP may support a plurality of virtual interfaces. The plurality of virtual interfaces supported by the physical AP may provide respective functionalities to stations (STAs) of respective BSSs. Example embodiments of the present disclosure relate to frame processing operations for the plurality of virtual interfaces. FIG. 1 illustrates an example environment 100 in which example embodiments of the present disclosure can be implemented.

In the example environment 100, an AP (which may be a physical device) 110, one or more STAs (e.g., STAs 120, 130, and 140), and an AP 150 are shown in communication. The physical AP 110 may support a plurality of virtual interfaces (e.g., three virtual interfaces 111-113) where each of the virtual interfaces 111-113 may act as a virtual AP to the STAs and other APs. Similarly, the further physical AP 150 may support a plurality of virtual interfaces (e.g., three virtual interfaces 151-153), where each of the virtual interfaces 151-153 may act as an AP. The virtual interfaces 111-113 and 151-153 may be configured based on the functionalities to be provided at the physical APs 110 and 150.

In some embodiments, the AP 110 may communicate with the STAs 120-140 and/or the AP 150 in a Virtual Local Area Network (VLAN). In this case, the virtual interfaces may be referred to as VLAN interfaces. The AP 110 may support three VLAN interfaces to manage three respective groups of stations. Each group of stations is uniquely identified by a VLAN identifier. For example, the virtual interface 111 may manage the STAs 120 and 130. The group of STAs 120 and 130 may be identified by the identifier of the virtual interface 111, e.g., VLAN 1.

In some embodiments, the AP 110 may communicate with the STAs 120-140 and/or the AP 150 over a radio channel of a wireless local area network (WLAN). Similarly, although not shown, the AP 150 may also communicate with the STAs 120-140 over a radio channel in WLAN. In this case, the virtual interfaces in the AP 110 and AP 150 may be referred to as VAPs. In the illustrated example, the AP 110 or AP 150 may support three VAPs to manage three respective WLANs (also referred to as BSSs), i.e. three groups of stations. Each BSS is uniquely identified by a specific service set identification (SSID).

The virtual interfaces 111-113 supported by the AP 110 may provide different services and functionalities. In some embodiments, the virtual interfaces 111-113 may provide networking services with different security requirement. The virtual interfaces 111-113 can be configured with different security certification programs such as Wired Equivalent Privacy (WEP), Wi-Fi Protected Access (WPA) and WPA 2.

For example, the virtual interface 111 may manage a first WLAN (or BSS) with a name "guest" as the SSID of the first WLAN and the virtual interface 112 may manage a second WLAN (or BSS) with a name "employee" as the SSID. The virtual interface 113 may manage a third WLAN (or BSS) with a name "VIP" as the SSID. In this example, the virtual interface 113 configured with WPA 2 may provide a networking service with the highest security requirement among the virtual interfaces 111-113. The virtual interface 112 configured with WPA may provide a networking service with a higher security requirement than the virtual interface 111 configured with WEP. It is to be understood that the virtual interfaces 151-153 in the AP 150 may also provide their services and functionalities.

The STA 120 may register with the virtual interface 111 and thus join the first WLAN "guest". The STA 120 under the management of the virtual interface 111 may be provided with the networking service with the lowest security requirement. The STA 130 may register with the virtual interface 112 and thus join the second WLAN "employee". The STA 140 may register with the virtual interface 113 and thus join the second WLAN "VIP". The STA 130 may be under the management of the virtual interface 112 and the STA 140 may be under the management of the virtual interface 113. The STA 140 under the management of the virtual interface 113 may be provided with the networking service with the highest security requirement.

It is to be noted that the numbers of APs, STAs and virtual interfaces shown in FIG. 1 are not limiting. The communication environment in which example embodiments of the present disclosure can be implemented may be configured differently with the example environment shown in FIG. 1. For example, example embodiments of the present disclosure can further be implemented in a wireless ad hoc network.

With the plurality of virtual interfaces supported at the physical APs, different services may be provided to respective group of stations. However, in this case, when a multicast/broadcast frame addressed to the plurality of virtual interfaces supported by the physical AP is received, the received frame is typically processed for each virtual interface. In other words, the multicast/broadcast frame addressed to the plurality of virtual interfaces is processed repeatedly for each virtual interface.

However, the processing operations performed on the received frame for each of the virtual interfaces may comprise a number of operations which are the same for all of the virtual interfaces. For example, the received frame may be parsed for a number of times for all of the virtual interfaces. The repetition of the same operations may cause a waste of computing resources and time resources.

Particularly, in the dense deployment case where thousands of STAs and APs are deployed, the number of broadcast/multicast frames increases dramatically and thus the consumption of resources caused by the performance of these repeated operations is unacceptable. Moreover, with the advancement of Wi-Fi protocols, for example, the Wi-Fi 6E protocol, a beacon frame may contain information elements of one or more virtual interfaces supported by a physical AP and thus the beacon size becomes larger. In this case, only parsing a frame may consume a lot of computing and time resources. Therefore, it is desired to reduce or minimize the resource consumption during the frame processing for the virtual interfaces of the physical AP.

Various example embodiments of the present disclosure propose a solution to improve the efficiency of performing processing operations on the frame addressed to the plurality of virtual interfaces supported by the physical AP. Specifically, a pre-processing operation is performed on the frame at a protocol layer between a physical layer and an upper layer of the access point to obtain a pre-processed frame. The pre-processing operation comprises a common operation to be performed for the plurality of virtual interfaces at the protocol layer. A plurality of interface-specific operations is then performed based on the pre-processed frame, where each inter-specific operation is specific to respective one of the plurality of virtual interfaces. In this way, by performing a pre-processing operation common to the virtual interfaces supported by the physical AP, the consumption of resources caused by the performance of repeated operations in the frame processing operation can be reduced.

Some example embodiments of the present disclosure will be discussed in detail below with reference to FIGS. 2-5.

Figure 2:
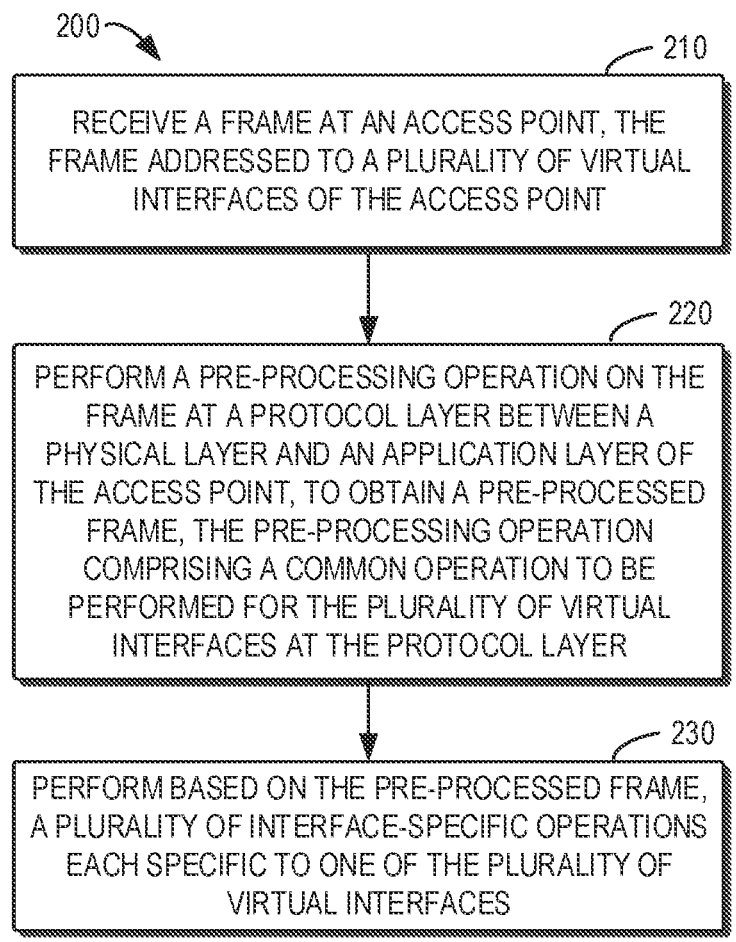
FIG. 2 illustrates a flowchart of a method in accordance with some example embodiments of the present disclosure.

FIG. 2 illustrates a flowchart of a method 200 in accordance with some example embodiments of the present disclosure. The method 200 can be carried out by either the AP 110 or the AP 150 according to the embodiments described herein. For the purpose of discussion, the method 200 will be described with reference to FIG. 1, to discuss example embodiments of performing frame processing operations at the AP 110. While only some blocks are shown in FIG. 2, the method 200 may comprise other operations described herein.

At block 210, the AP 110 receives a frame addressed to the plurality of virtual interfaces 111-113 of the AP 110. In some embodiments, the frame may be a broadcast frame or a multicast frame addressed to the plurality of virtual interfaces 111-113. It is to be noted that herein the multicast frame refers to a frame addressed to a number of STAs and APs, not all of the STAs and APs in a communication environment. The multicast or broadcast frame received at the AP 110 is addressed to the plurality of virtual interfaces 111-113 of the AP 110.

In some embodiments, the AP 110 may receive the frame via a network interface card (NIC) of the AP 110. The NIC refers to both a physical layer and data link layer device which provides networking capabilities. Examples of the NIC may comprise a physical radio enabling a wireless connection (such as Wi-Fi) and an Ethernet interface enabling a wired connection. For example, the AP 110 may receive a wireless broadcast/multicast frame via the physical radio. Alternatively, the AP 110 may receive a wired broadcast/multicast frame via the Ethernet interface.

For example, in the environment illustrated in FIG. 1, the AP 110 may receive the frame from the AP 150 or any of the STAs 120-140 connected to the AP 110. As an example, the AP 110 may receive a beacon frame from the AP 150. The beacon frame may be used to notify the AP 110 that the AP 150 is still working. The beacon frame may convey information about the properties of the AP 150.

In some embodiments related to the Wi-Fi 6E protocol, the beacon frame may comprise information elements of one or more virtual interfaces of the AP 150. As another example, the AP 110 may receive a probe request frame from the STA 120. The STA 120 may transmit the probe request frame to scan the area for availability of WLAN network. The probe request frame may include the SSID of the WLAN network the STA 120 wants to join.

In example embodiments of the present disclosure, a processing procedure of a received frame is split into two stages. A first stage is a pre-processing stage where one or more operations common to a plurality of virtual interfaces of the AP are to be applied to the frame. The first stage may be performed once for the plurality of virtual interfaces. A second stage is an interface-specific processing stage which is performed for each of the virtual interfaces to which the frame is addressed.

Specifically, at block 220 of FIG. 2, the AP 110 performs a pre-processing operation on the frame, to obtain a pre-processed frame. The pre-processing operation may be performed at a protocol layer between a physical layer and an upper layer of the AP 110. The pre-processing operation comprises a common operation to be performed for the plurality of virtual interfaces 111-113 at the protocol layer.

In some embodiments, depending on the communication standards and protocols to be complied by the AP 110, the protocol layer may comprise a MAC layer, a data link layer a network layer, or the like. Examples of the upper layer may comprise a session layer, a presentation layer and an application layer.

The pre-processing operation comprises a common operation to be performed at the protocol layer. In other words, one or more operations same to the plurality of virtual interfaces 111-113 to be performed at the protocol layer may be determined as the pre-processing operation and may be performed once for all of the plurality of virtual interfaces.

In some embodiments, examples of the common pre-processing operation may comprise the operation of parsing the frame. The AP 110 may parse the frame according to a protocol corresponding to the plurality of virtual interfaces. For example, the AP 110 may determine every segment within the frame according to the IEEE 802.11 protocol corresponding to the plurality of VAPs. Alternatively, the AP 110 may determine every segment within the frame according to the IEEE 802.3 protocol corresponding to the plurality of VLAN interfaces.

Alternatively or in addition, examples of the common operation may comprise performing a filtering operation on the frame. As an example, the AP 110 may perform a filtering operation on the frame to identify one or more fields of interest in the received frame. The AP 110 may perform the filtering operation based on the identified type of the received frame. As another example, the AP 110 may drop the received frame if errors are identified in the received frame.

Alternatively or in addition, examples of the common operation may comprise enabling forward compatibility for the frame. For example, the AP may perform the IEEE 802.11b/g or 11n protection for the received frame. Thus the received frame can be processed with a newer version of the IEEE 802.11 (e.g., IEEE 802.1 lax) protocol stack corresponding to the plurality of virtual interfaces.

In some embodiments, the AP 110 may perform the pre-processing operation with a protocol stack corresponding to the plurality of virtual interfaces 111-113. As an example, when the plurality of virtual interfaces 111-113 are supported by the AP 110, the AP 110 may perform the pre-processing operation with the IEEE 802.11 protocol stack. As another example, when the plurality of VLAN interfaces 111-113 are supported by the AP 110, the AP 110 may perform the pre-processing operation with the IEEE 802.3 protocol stack.

At block 230, the AP 110 performs a plurality of interface-specific operations based on the pre-processed frame. An interface-specific operation is specific to a respective one of the plurality of virtual interfaces 111-113. For example, the AP 110 may perform a first processing operation specific to the virtual interface 111 based on the pre-processed frame. In addition, the AP 110 may perform a second processing operation specific to the virtual interface 112 based on the pre-processed frame. The AP 110 may perform a third processing operation specific to the virtual interface 113 based on the pre-processed frame.

In some embodiments, the AP 110 may perform the plurality of interface-specific operations based on the pre-processed frame at the protocol layer. The AP 110 may perform the plurality of interface-specific operations based on the capabilities and/or policies of the virtual interfaces 111-113. As an example, after the AP 110 performs a pre-processing operation on a broadcast beacon frame from the further AP 150, the AP 110 may determine to drop the pre-processed beacon frame for the virtual interfaces 111 according to the access control policy of the virtual interface 111.

As another example, after the AP 110 performs a pre-processing operation on a broadcast probe request frame from the STA 120, the AP 110 may identify the SSID of the target VAP to be associated with the STA 120 and cause the target VAP to transmit a probe response frame to the STA 120. The AP 110 may further cause the other VAPs not to transmit probe response frames to the STA 120.

Alternatively or in addition, the AP 110 may perform the plurality of interface-specific operations based on the pre-processed frame at the upper layer. As an example, after the AP 110 performs a pre-processing operation on a broadcast data frame from the STA 120, the AP 110 may perform interface-specific packet capture operations based on the pre-processed frame. Specifically, for each VAP, the AP 110 may determine whether to capture the pre-processed frame based on the services to be provided by the respective VAP.

As another example, for each VAP, the AP 110 may determine whether to drop or forward the pre-processed frame depending on a policy of the respective VAP. Each VAP has its own policy to forward or drop some specific frames. For example, the VAP 111 may be configured with a policy to forward Address Resolution Protocol (ARP)-only frames and drop other broadcast frames. In this case, for the VAP 111, the AP 110 may determine whether the pre-processed frame is an ARP-only frame and forward the pre-processed frame in responsive to a determination that the pre-processed frame is an ARP-only frame.

In some embodiments, the AP 110 may perform a processing operation specific to one of the plurality of virtual interface based on information associated with the respective virtual interface in the pre-processed frame. Examples of the information may comprise an identifier of the respective virtual interface, such as a VLAN identifier or a SSID. Examples of the information may further comprise requirement of the services and functionalities to be provided.

Alternatively or in addition, the AP 110 may perform a processing operation specific to one of the plurality of virtual interface based on configuration of the respective virtual interface. Examples of the configuration may comprise a forward policy, a security requirement, a Quality of service (QoS) and a number of associated STAs. For example, the AP 110 may determine whether the number of STAs associated with each virtual interface exceeds a threshold. If the number of STAs associated with the virtual interface 111 exceeds the threshold, the AP 110 may cause the virtual interface 111 to reject a request transmitted from a further STA to associate with the virtual interface 111.

Figure 3:
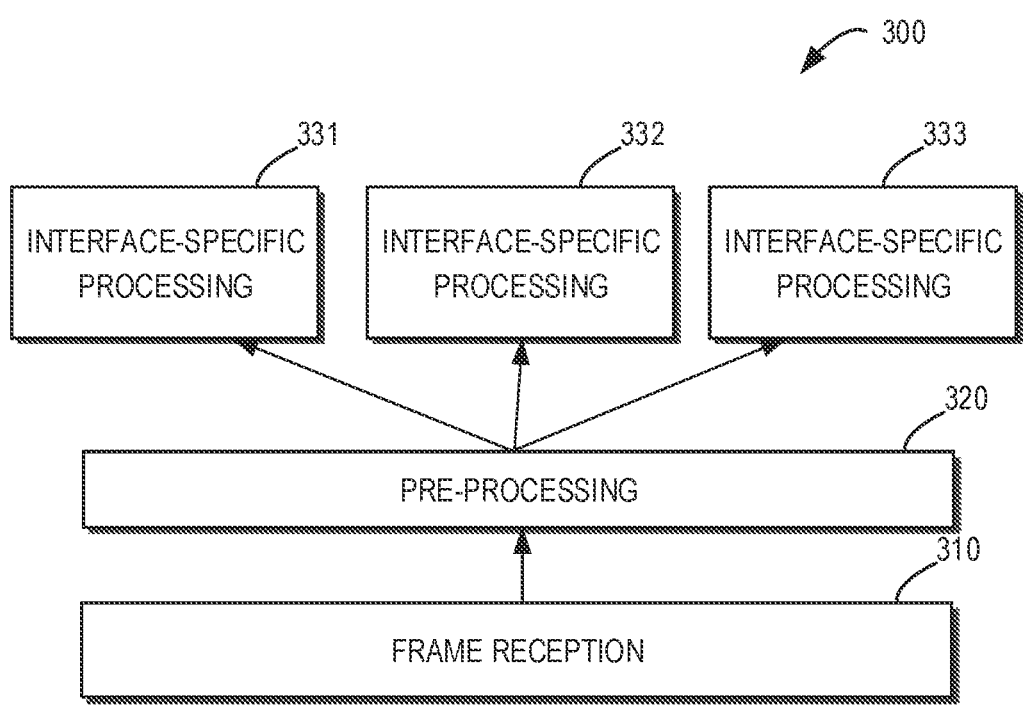
FIG. 3 illustrates a schematic diagram of an example frame processing procedure in which example embodiments of the present disclosure can be implemented.

FIG. 3 illustrates a schematic diagram of an example frame processing procedure 300 in accordance with some example embodiments of the present disclosure. For the purpose of discussion, the procedure 300 will be described with reference to FIG. 1 to discuss example embodiments of performing the frame processing operation at the AP 110.

As shown in FIG. 3, the AP 110 receives, at block 310, a frame addressed to the plurality of virtual interfaces 111-113 of the AP 110. The AP 110 performs at block 320, a pre-processing operation common to the virtual interfaces 111-113 on the received frame. In other words, the AP 110 performs a pre-processing operation once for all of the plurality of virtual interfaces 111-113. The AP 110 further performs a plurality of interface-specific operations based on the pre-processed frame. An interface-specific operation is specific to a respective one of the plurality of virtual interfaces 111-113.

As shown in FIG. 3, the AP 110 may perform, at block 331, a processing operation specific to the virtual interface 111 based on the pre-processed frame. Similarly, the AP 110 may perform, at block 332, a processing operation specific to the virtual interface 112 based on the pre-processed frame. The AP 110 may perform, at block 333, a processing operation specific to the virtual interface 113 based on the pre-processed frame.

Figure 4:
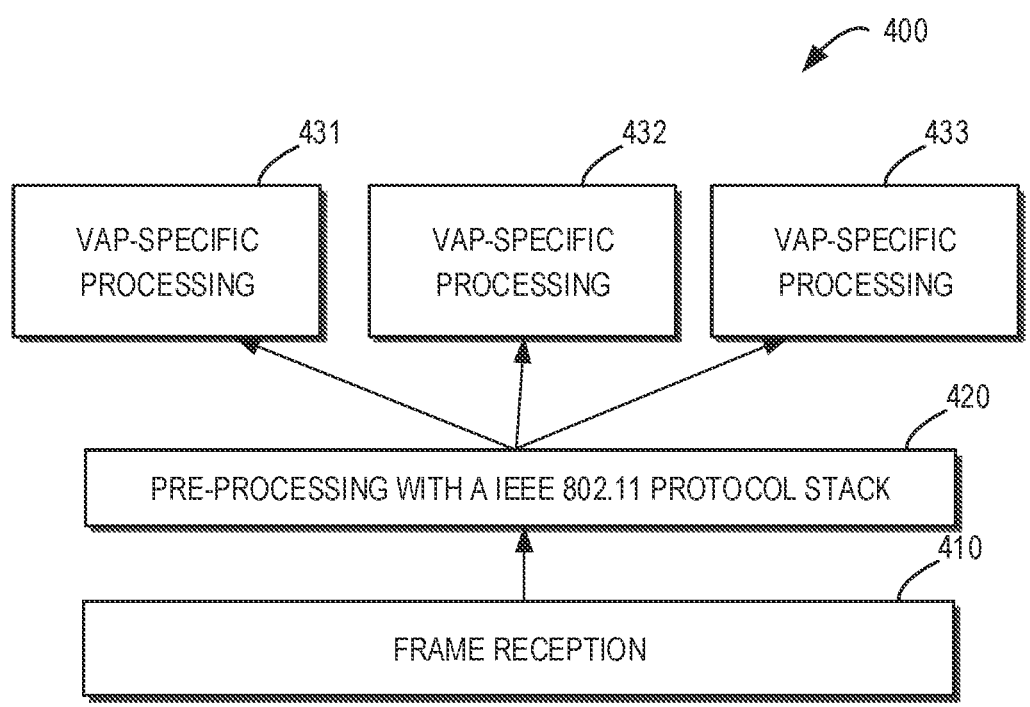
FIG. 4 illustrates a schematic diagram of an example frame processing procedure for a plurality of VAPs in which example embodiments of the present disclosure can be implemented.

FIG. 4 illustrates a schematic diagram of an example frame processing procedure 400 for a plurality of VAPs in which example embodiments of the present disclosure can be implemented. For the purpose of discussion, the procedure 400 will be described with reference to FIG. 1 to discuss example embodiments of performing the frame processing operation at the AP 110. As shown in FIG. 4, at block 410, the AP 110 receives a frame addressed to the plurality of VAPs of the AP 110. At block 420, the AP 110 performs a pre-processing operation common to the VAPs on the received frame with the IEEE 802.11 protocol stack. In other words, the AP 110 performs a pre-processing operation once for all of the plurality of VAPs.

As shown in FIG. 4, the AP 110 may perform, at block 431, a processing operation specific to a first VAP (e.g., the virtual interface 111) based on the pre-processed frame. In addition, the AP 110 may perform, at block 432, a processing operation specific to a second VAP (e.g., the virtual interface 112) based on the pre-processed frame. The AP 110 may perform, at block 433, a processing operation specific to a third VAP (e.g., the virtual interface 113) based on the pre-processed frame.

In this way, the AP 110 performs the pre-processing operation once for all of the plurality of virtual interfaces 111-113 and then performs the interface-specific operations for the respective virtual interfaces 111-113. In other words, the typical frame processing operation for each of the virtual interfaces 111-113 is divided into a pre-processing operation and an interface-specific processing operation. In this case, by performing the pre-processing operation common to the plurality of virtual interfaces once for all of the plurality of virtual interfaces supported by the AP, the repetition of the performance of same operations can be avoided and thus the efficiency of performing the frame processing operation on the frame addressed to the plurality of virtual interfaces can be improved.

It is to be noted that, the pre-processing operation may be performed more than once as required. For example, the pre-processing operation may be performed twice to validate the frame processing operation. Moreover, one or more operations same to the plurality of virtual interfaces 111-113 to be performed at the upper layer may be determined as a further common pre-processing operation. By performing the further common pre-processing operation for the plurality of virtual interfaces 111-113, the consumption of resources caused by the performance of repeated operations in the frame processing operation can be further reduced.

Figure 5:
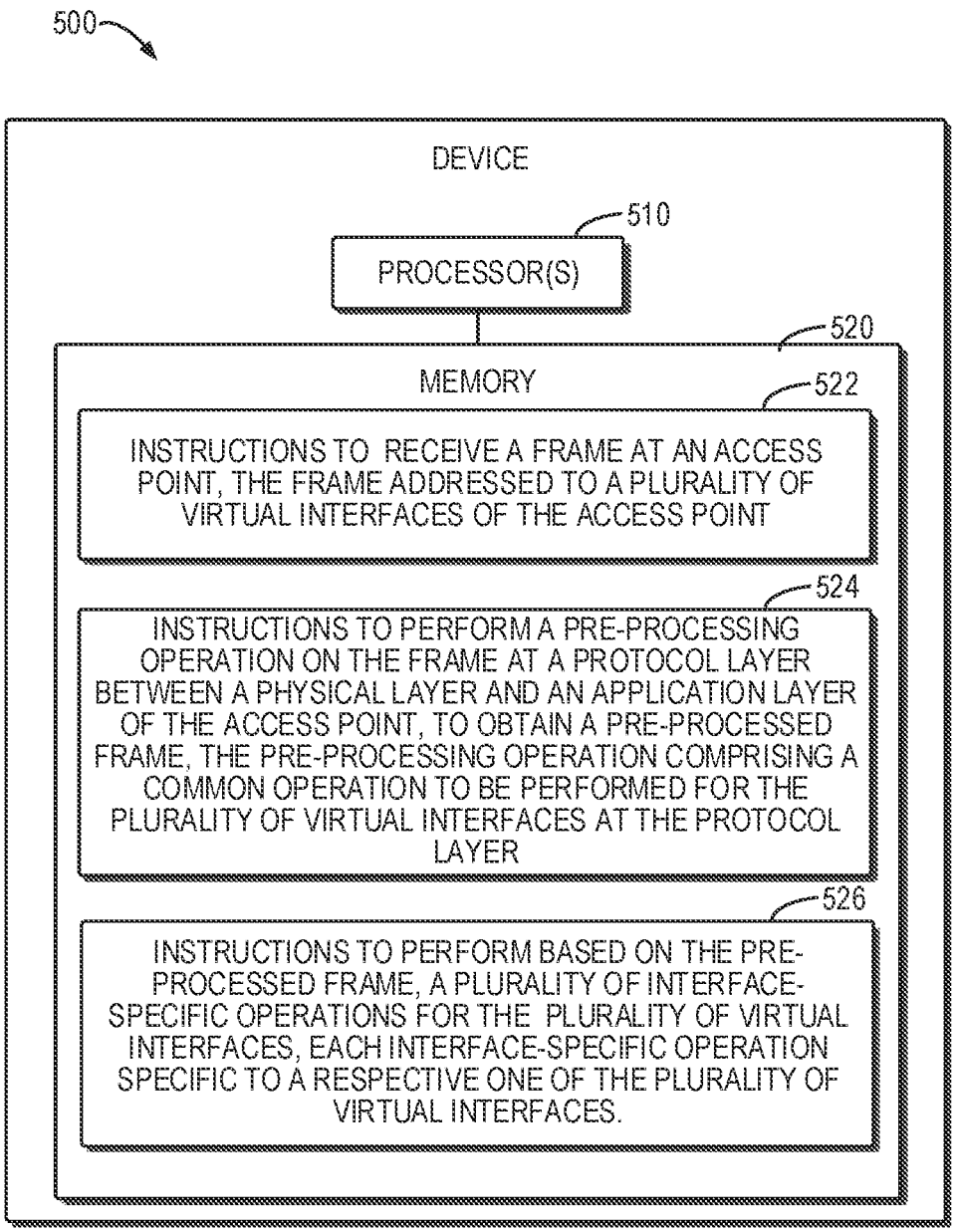
FIG. 5 illustrates a block diagram of an access point according to embodiments of the present disclosure.

FIG. 5 illustrates a block diagram 500 of an AP according to embodiments of the present disclosure. For the purpose of discussion, the block diagram 500 will be described with reference to FIG. 1 to discuss example embodiments of the AP 110. The AP 110 comprises a processor 510 and a memory 520 coupled to the processor 510. The memory 520 stores instructions 522, 524 and 526 to cause the processor 510 to implement a method to performed at the AP 110.

As illustrated in FIG. 5, the memory 520 stores instructions 522 causing the processor 510 to receive, a frame at an access point, the frame addressed to a plurality of virtual interfaces of the access point. In some example embodiments, the instructions 522 causing the processor 510 to receive a frame at an access point comprise instructions to receive a broadcast frame or a multicast frame addressed to the plurality of virtual interfaces.

In some example embodiments, the instructions 522 causing the processor 510 to receive a frame at an access point comprise instructions to receive the frame from a further access point and the frame comprises information elements of one or more virtual interfaces of the further access point.

The memory 520 further stores instructions 524 causing the processor 510 to perform a pre-processing operation on the frame at a protocol layer between a physical layer and an upper layer of the access point, to obtain a pre-processed frame, the pre-processing operation comprising a common operation to be performed for the plurality of virtual interfaces at the protocol layer.

In some example embodiments, the instructions 524 causing the processor 510 to perform the pre-processing operation on the frame comprise instructions causing the processor 510 to perform, with a protocol stack corresponding to the plurality of virtual interfaces, the pre-processing operation on the frame.

In some example embodiments, the instructions 524 causing the processor 510 to perform the pre-processing operation on the frame comprise instructions causing the processor 510 to perform at least one of: parsing the frame; performing a filtering operation on the frame; and enabling forward compatibility for the frame.

The memory 520 further stores instructions 526 causing the processor 510 to perform, based on the pre-processed frame, a plurality of interface-specific operations for the plurality of virtual interfaces, each interface-specific operation specific to a respective one of the plurality of virtual interfaces.

In some example embodiments, the instructions 526 causing the processor 510 to perform the plurality of interface-specific operations comprise instructions causing the processor 510 to perform the plurality of interface-specific operations at the protocol layer or the upper layer.

In some example embodiments, the instructions 526 causing the processor 510 to perform the plurality of interface-specific operations comprise instructions causing the processor 510 to perform, for a virtual interface of the plurality of interfaces, a processing operation based on at least one of: information associated with the virtual interface in the pre-processed frame; and configuration of the virtual interface.

With these embodiments, by performing a pre-processing operation common to the plurality of the virtual interfaces of the AP, the consumption of resources caused by the performance of repeated operations in the frame processing operation can be reduced. Therefore, the efficiency of performing a frame processing operation on a multicast/broadcast frame addressed to the plurality of virtual interfaces of the physical AP can be improved.

The present disclosure also provides at least one computer program product tangibly stored on a non-transitory computer-readable storage medium. The computer program product includes program codes or instructions which can be executed to carry out the method as described above with reference to FIG. 2.

While some of the operations in the foregoing embodiments were implemented in hardware or software, in general the operations in the preceding embodiments can be implemented in a wide variety of configurations and architectures. Therefore, some or all of the operations in the foregoing embodiments may be performed in hardware, in software or both.

It should be noted that specific terms disclosed in the present disclosure are proposed for convenience of description and better understanding of example embodiments of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method, comprising:
   receiving a frame at an access point, the frame addressed to a plurality of virtual interfaces of the access point;
   performing a pre-processing operation on the frame at a protocol layer between a physical layer and an upper layer of the access point, to obtain a pre-processed frame, wherein the protocol layer is a data link layer or a network link layer of the access point, wherein the upper layer is a session layer or an application layer of the access point, and wherein the pre-processing operation parses the frame according to a protocol corresponding to the plurality of virtual interfaces at the protocol layer; and
   performing, based on the pre-processed frame, a plurality of interface-specific operations each specific to one of the plurality of virtual interfaces.

2. The method according to claim 1, wherein performing the plurality of interface-specific operations comprises:
   performing the plurality of interface-specific operations at the protocol layer or the upper layer.

3. The method according to claim 1, wherein the frame comprises a broadcast frame or a multicast frame addressed to the plurality of virtual interfaces.

4. The method according to claim 1, wherein performing the pre-processing operation on the frame comprises:
   performing, with a protocol stack corresponding to the plurality of virtual interfaces, the pre-processing operation on the frame.

5. The method according to claim 1, wherein performing the pre-processing operation on the frame comprises performing at least one of:
   performing a filtering operation on the frame; and
   enabling forward compatibility for the frame.

6. The method according to claim 1, wherein performing the plurality of interface-specific operations comprises:
   performing, for a virtual interface of the plurality of interfaces, a processing operation based on at least one of:
   information associated with the virtual interface in the pre-processed frame; and
   configuration of the virtual interface.

7. The method according to claim 1, wherein receiving the frame comprises:
   receiving the frame from a further access point or a station connected to the access point.

8. An access point comprising:
   at least one processor; and
   a memory coupled to the at least one processor, the memory storing instructions to cause the at least one processor to perform acts comprising:
   receiving a frame at an access point, the frame to be processed for a plurality of virtual interfaces of the access point;
   performing a pre-processing operation on the frame at a protocol layer between a physical layer and an upper layer of the access point, to obtain a pre-processed frame, wherein the protocol layer is a data link layer or a network link layer of the access point, wherein the upper layer is a session layer or an application layer of the access point, wherein the pre-processing operation parses the frame according to a protocol corresponding to the plurality of virtual interfaces at the protocol layer; and
   performing, based on the pre-processed frame, a plurality of interface-specific operations each specific to one of the plurality of virtual interfaces.

9. The access point of claim 8, wherein performing the plurality of interface-specific operations comprises:
   performing the plurality of interface-specific operations at the protocol layer or the upper layer.

10. The access point of claim 8, wherein the frame comprises a multicast frame addressed to the plurality of virtual interfaces.

11. The access point of claim 8, wherein the frame comprises a broadcast frame.

12. The access point of claim 8, wherein performing the pre-processing operation on the frame comprises:
    performing, with a protocol stack corresponding to the plurality of virtual interfaces, the pre-processing operation on the frame.

13. The access point of claim 8, wherein performing the pre-processing operation on the frame comprises performing at least one of:
    performing a filtering operation on the frame; and
    enabling forward compatibility for the frame.

14. The access point of claim 8, wherein performing the plurality of interface-specific operations comprises performing, for a virtual interface of the plurality of interfaces, a processing operation based on at least one of:
    information associated with the virtual interface in the pre-processed frame; and
    configuration of the virtual interface.

15. A non-transitory computer-readable medium comprising instructions stored thereon which, when executed by an apparatus, cause the apparatus to:
    receive a frame at an access point, the frame addressed to a plurality of virtual interfaces of the access point;
    perform a pre-processing operation on the frame at a protocol layer between a physical layer and an upper layer of the access point, to obtain a pre-processed frame, wherein the protocol layer is a data link layer or a network link layer of the access point, wherein the upper layer is a session layer or an application layer of the access point, wherein the pre-processing operation parses the frame according to a protocol corresponding to the plurality of virtual interfaces at the protocol layer; and perform, based on the pre-processed frame, a plurality of interface-specific operations for the plurality of virtual interfaces, each interface-specific operation specific to a respective one of the plurality of virtual interfaces.

16. The computer-readable medium of claim 15, wherein the instructions causing the apparatus to perform the plurality of interface-specific operations comprise instructions causing the apparatus to:

perform the plurality of interface-specific operations at the protocol layer or the upper layer.

17. The computer-readable medium of claim 15, wherein the instructions causing the apparatus to receive the frame comprise instructions causing the apparatus to receive a broadcast frame or a multicast frame addressed to the plurality of virtual interfaces.

18. The computer-readable medium of claim 15, wherein the instructions causing the apparatus to perform the pre-processing operation on the frame comprise instructions causing the apparatus to:

perform, with a protocol stack corresponding to the plurality of virtual interfaces, the pre-processing operation on the frame.

19. The computer-readable medium of claim 15, wherein the instructions causing the apparatus to perform the pre-processing operation on the frame comprise instructions causing the apparatus to perform at least one of:

performing a filtering operation on the frame; and enabling forward compatibility for the frame.

20. The computer-readable medium of claim 15, wherein the instructions causing the apparatus to perform the plurality of interface-specific operations comprise instructions causing the apparatus to perform, for a virtual interface of the plurality of interfaces, a processing operation based on at least one of:

information associated with the virtual interface in the pre-processed frame; and configuration of the virtual interface.

* * * * *